UNITED STATES PATENT OFFICE 2,602,801

METHOD FOR THE PREPARATION OF DIALKYL BETA-PROPIOTHETINS

Max E. Roha, Brecksville, Ohio, assignor to The B. F. Goodrich Company, New York, N. Y., a corporation of New York No Drawing. Application July 9, 1951,
Serial No. 235,905

7 Claims. (Cl. 260—327)

1

This invention relates to the method for the preparation of dialkyl beta-propiothetins, and pertains more particularly to the preparation of such compounds by the reaction of dialkyl sulfides with beta-lactones.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone), which has the formula

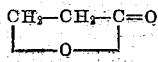

is economically obtained from ketene and formaldehyde. The ease with which such beta-lactones are obtained makes it desirable to use these compounds as starting materials in the synthesis of many other useful compounds.

It has now been discovered that such beta-lactones react directly with the highly nucleophilic dialkyl sulfides of the structure

wherein each R is an alkyl radical, and preferably a lower alkyl radical such as methyl, ethyl, propyl or butyl, to give nearly quantitative yields of beta-dialkyl propiothetins, which are preferably isolated as the salts of strong acids such as hydrochloric acid. The propiothetins thus obtained are extremely valuable compounds, being especially useful in biochemical studies of metabolism in animals. They also possess insecticidal, fungicidal and herbicidal properties, and are useful for many other purposes.

The reaction of beta-lactones with dialkyl sulfides in accordance with the present invention proceeds substantially according to the following equation:

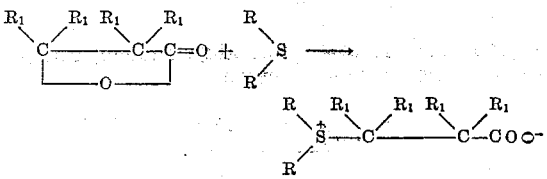

wherein each R is an alkyl radical and each $R_1$ is a member of the class consisting of hydrogen and lower alkyl radicals, preferably containing from 1 to 4 carbon atoms.

The dialkyl sulfides which are reacted with

2 beta-lactones in accordance with the above equation possess the structure

and include dimethyl sulfide, diethyl sulfide, dipropyl sulfide, dibutyl sulfide, methyl ethyl sulfide, methyl propyl sulfide, methyl butyl sulfide, ethyl propyl sulfide, and the like. Dimethyl sulfide is especially useful in the above reaction since it is readily available commercially, reacts most readily of all the dialkyl sulfides with beta-lactones, and forms very useful products therewith.

As disclosed hereinabove, the beta-lactones which are reacted with dialkyl sulfides in accordance with this invention are saturated aliphatic beta-lactones which possess the structure

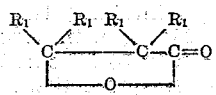

wherein each $R_1$ is a member of the class consisting of hydrogen and lower alkyl radicals, preferably containing from 1 to 4 carbon atoms. Typical examples of such beta-lactones include, in addition to beta-propiolactone, beta-butyrolactone, beta-isobutyrolactone, beta-n-valerolactone, beta-isovalerolactone, beta-isopropyl-beta-propiolactone, beta-ethyl-beta-butyrolactone, alpha-methyl-beta-propiolactone, alpha, alpha-dimethyl-beta-propiolactone, alpha, beta-dimethyl-beta-propiolactone and the like. Especially preferred beta-lactones for use in this process are those which are water-soluble; beta-lactones containing from 3 to 6 carbon atoms possess this property.

As indicated by the general equation set forth hereinabove, 1 mole of the dialkyl sulfide is stoichiometrically required to react with 1 mole of beta-lactone to form a dialkyl beta-propiothetin. However, other quantities of the reactants may be used, and in fact, the reaction is preferably carried out utilizing a slight excess of the dialkyl sulfide, for example, about 1.1 to 2 moles of the dialkyl sulfide for each mole of the beta-lactone.

In carrying out the reaction of this invention, the reactants are brought together in a substantially neutral liquid medium, preferably in the presence of a neutral polar solvent such as liquid nitriles of the structure RCN, wherein R is an alkyl radical, or liquid nitroalkanes and the like. Other neutral polar solvents may also be used; however, some such polar solvents such as alcohols, also react quite readily with beta-lactone so that the yield of the desired propiothetin is substantially decreased when such solvents are utilized. It is to be understood, however, that the use of a solvent for the reactants is not a critical expedient in carrying out the reaction of the present invention, for the reaction may be carried out without the use of a solvent since the mere admixing of the lactone and the sulfide produces a substantially neutral liquid medium.

The reaction is preferably carried out at temperatures in the range of about 20 to 100° C., but the precise temperature is not critical.

The dialkyl beta-propiothetins tend to be relatively unstable compounds and for that reason are preferably isolated in the form of an acid salt which is readily precipitated simply by adding a strong acid such as hydrochloric acid or sulfuric acid to the reaction mixture after the reaction between the dialkyl sulfide and the beta-lactone is substantially complete.

The more detailed practice of the invention is illustrated by the following examples, wherein parts are given by weight. There are, of course, many other reaction procedures which are operative in addition to those of the specific examples and which will be apparent to those skilled in the art.

*Example 1*

Thirty-six parts (0.5 mole) of beta-propiolactone, 100 parts (1.6 moles) of dimethyl sulfide and 195 parts of acetonitrile are admixed at room temperature. Upon mixing a mild exothermic reaction occurs during which the temperature rises about 3° C. After the reaction mixture is allowed to stand for several days, dry hydrogen chloride is added to precipitate the hydrochloric acid salt, while maintaining the solution temperature below 25° C. with external cooling. Fifty-three parts (62%) of the hydrochloric acid salt of dimethyl beta-propiothetin are obtained, the pure product melting at 126° to 127° C. The product analyzed 20.4% chlorine (theory, 20.8%) and is further identified by preparation of the picrate derivative which melts at 130 to 131° C. with some decomposition.

*Example 2*

Example 1 is repeated except that the reactants are refluxed for 3½ hours at 50° to 53° C. A 70% yield of the hydrochloric acid salt of dimethyl beta-propiothetin is obtained.

*Example 3*

A solution is prepared by dissolving 36 parts of beta-propiolactone and 62 parts of dimethyl sulfide in 58 parts of acetonitrile. The solution is maintained at room temperature for a period of 22 hours after which dry hydrogen chloride is added to the reaction mixture to precipitate the hydrochloric acid salt of dimethyl beta-propiothetin. An 84% yield of the desired product is obtained.

*Example 4*

Example 2 is repeated substituting beta-butyrolactone for the beta-propiolactone. A substantial yield of a propiothetin having the following structural formula

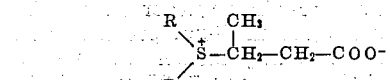

is obtained.

*Example 5*

29 parts (0.4 mole) of beta-propiolactone, 100 parts (1.32 moles) of methyl ethyl sulfide and 180 parts of acetonitrile are admixed at room temperature. The reaction mixture is then allowed to stand for 24 hours. Anhydrous hydrochloric acid is then added and a viscous green liquid is obtained in a 44% yield. This liquid is identified by chlorine analysis as the hydrochloric acid salt of methyl ethyl beta-propiothetin.

Similarly, when the above examples are repeated using other of the dialkyl sulfides disclosed hereinabove in place of dimethyl sulfide, good yields of the corresponding dialkyl beta-propiothetin are again obtained. Thus, for example, beta-propiolactone and diethyl sulfide react to give diethyl beta-propiothetin; and methyl propyl sulfide reacts with beta-propiolactone to give methyl propyl beta-propiothetin.

Numerous other variations and modifications in the procedure described will occur to those skilled in the art and are included within the spirit and scope of the invention as defined in the appended claims.

I claim:

1. The method which comprises bringing together in a substantially neutral liquid medium a dialkyl sulfide in which each alkyl radical is a lower alkyl radical and a saturated aliphatic beta-lactone, thereby to obtain a dialkyl beta-propiothetin.

2. The method which comprises bringing together in a substantially neutral liquid medium a dialkyl sulfide of the structure

wherein each R is a lower alkyl radical, with a beta-lactone of the structure

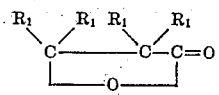

wherein each $R_1$ is a member of the class consisting of hydrogen and lower alkyl radicals, thereby to obtain a dialkyl beta-propiothetin of the formula

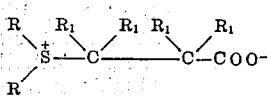

wherein each R and $R_1$ has the significance given hereinabove.

3. The method which comprises dissolving a dialkyl sulfide of the structure

wherein each R is a lower alkyl radical, and a beta-lactone of the structure

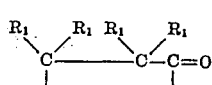

wherein each $R_1$ is a member of the class consisting of hydrogen and lower alkyl radicals, in a neutral polar solvent, maintaining the resulting solution at a temperature in the range of about 20° C. to 100° C., thereby to obtain a dialkyl beta-propiothetin of the structure

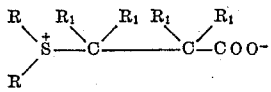

wherein each R and R₁ have the same significance as above.

4. The method of claim 3 wherein the dialkyl sulfide is dimethyl sulfide, the beta-lactone is beta-propiolactone, and the neutral polar solvent is acetonitrile, the product obtained being dimethyl beta-propiothetin.

5. The method which comprises bringing together in a substantially neutral liquid medium a dialkyl sulfide of the structure

wherein each R is a lower alkyl radical, and a beta-lactone of the structure

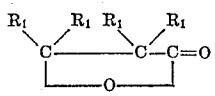

wherein each R₁ is selected from the class consisting of hydrogen and lower alkyl radicals, whereupon chemical reaction occurs between said dialkyl sulfide and said beta-lactone to form a dialkyl beta-propiothetin of the structure

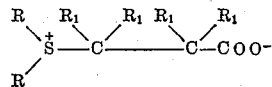

wherein each R and R₁ have the same significance as above, and recovering said dialkyl beta-propiothetin as the salt of a strong acid.

6. The method of claim 5 wherein the dialkyl sulfide is dimethyl sulfide, and the beta-lactone is beta-propiolactone.

7. The method which comprises dissolving dimethyl sulfide and beta-propiolactone in acetonitrile, maintaining the resulting solution at a temperature in the range of about 20° C. to 100° C., adding dry hydrogen chloride to the resulting reaction mixture and recovering the hydrochloric acid salt of dimethyl beta-propiothetin.

MAX E. ROHA.

REFERENCES CITED

The following references are of record in the file of this patent:

UNITED STATES PATENTS

| Number | Name | Date |
|---|---|---|
| 2,449,992 | Gresham et al. | Sept. 28, 1948 |
| 2,449,996 | Gresham et al. | Sept. 28, 1948 |
| 2,563,035 | Gresham et al. | Aug. 7, 1951 |